Patented Dec. 5, 1950

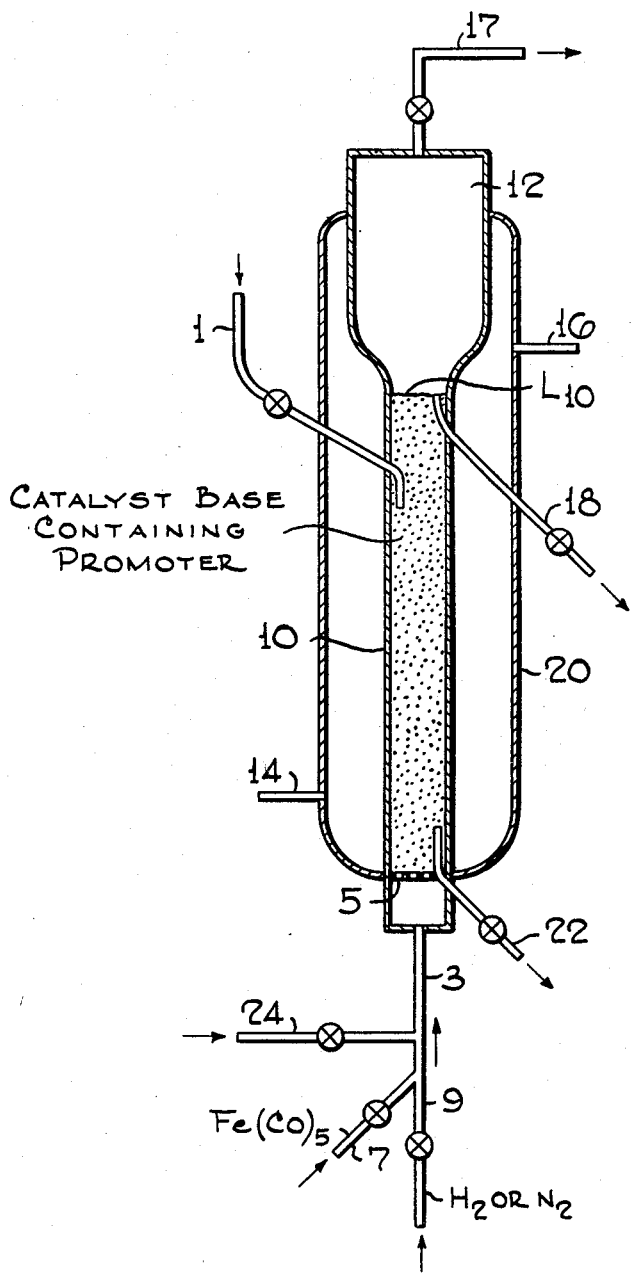

2,533,071

UNITED STATES PATENT OFFICE 2,533,071

SYNTHESIS OF HYDROCARBONS IN THE PRESENCE OF AN IRON TYPE CATALYST

Hans G. Vesterdal, Elizabeth, N. J., and Harry J. Sykes, El Rosal, Venezuela, assignors to Standard Oil Development Company, a corporation of Delaware Application October 1, 1947, Serial No. 777,308

3 Claims. (Cl. 260—449.6)

The present invention relates to catalytic conversions and improved catalysts therefor. More particularly, the invention is concerned with improved iron catalysts for the catalytic synthesis of normally liquid hydrocarbons and oxygenated compounds from CO and $H_2$.

Iron type catalysts are normally employed in the synthesis of hydrocarbons at relatively high temperatures of about 450°–800° F. and relatively high pressures of about 3–100 atmospheres abs. or higher, to obtain predominantly unsaturated and oxygenated products from which motor fuels with high octane ratings may be recovered.

The extreme temperature sensitivity and relatively rapid catalyst deactivation of the hydrocarbon synthesis have led, in recent years, to various attempts and proposals to employ the so-called fluid catalyst technique wherein the synthesis gas is contacted with a dense turbulent bed of finely divided catalyst fluidized by the gaseous reactants and products. This technique permits catalyst replacement without interruption of the process and greatly improved temperature control. However, the adaptation of the hydrocarbon synthesis to the fluid catalyst technique has encountered serious difficulties, particularly when iron catalysts are used.

Application of the fluid technique requires in addition to the conventional characteristics determining catalyst activity, such as total desired yield and active catalyst life ease of fluidization and attrition resistance. It is also desirable that the catalyst be active in the temperature range above 600° F. and still be largely selective to $C_4+$ hydrocarbons, since under these conditions high octane motor fuels are obtained. None of the prior art iron catalysts complies satisfactorily with all of these requirements.

Iron catalysts are usually prepared by the reduction of various natural or synthetic iron oxides or by the decomposition of iron carbonyls, the catalytic activity being enhanced by the addition of such promoters as various compounds of alkali metals or the oxides of chromium, zinc, aluminum, magnesium, manganese, the rare earth metals and others in small amounts of about 1–10%. While some of these catalysts exhibit excellent activity characteristics they are usually deficient with respect to ease of fluidization and/or attrition resistance particularly when used in commercial runs of several hundred hours' duration. Even fluidized catalysts obtained from sintered iron, which have been found to exhibit excellent fluidization and attrition characteristics show signs of disintegration in long run operation.

This general lack of mechanical resistance or steady decrease of mechanical strength during operation has been found to be closely connected to a high rate of carbon deposition on the catalyst, encountered at the conditions required by the synthesis using iron catalysts. The catalyst disintegration which accompanies excessive carbon deposition is believed to be the result of a migration of carbon into the iron lattice by the mechanism of interstitial carbide formation followed by disintegration of the carbide to free carbon. This process may continue until the catalyst mass contains about 99% of carbon.

It will be appreciated from the above that an iron catalyst of satisfactory synthesizing activity, selectivity, and catalyst life which may be used in commercial operation without substantial catalyst disintegration and carbon deposition is a need strongly felt in the synthesis art. This drawback of iron catalyst has been the major obstacle in all attempts to apply the fluid catalyst technique to the iron-catalyzed hydrocarbon synthesis. The present invention overcomes this obstacle.

It is, therefore, the principal object of the present invention to provide improved iron catalysts for the catalytic synthesis of hydrocarbons from CO and $H_2$.

A further object of our invention is to provide an improved hydrocarbon synthesis process operating in the presence of iron catalysts which are not subject to excessive disintegration and carbon deposition.

A more specific object of our invention is to provide an improved hydrocarbon synthesis process employing the fluid catalyst technique in the presence of iron catalysts of highest disintegration resistance throughout runs of commercial length.

Other and further objects and advantages of our invention will appear hereinafter.

In accordance with the present invention, carbon deposition on iron type synthesis catalysts is substantially reduced and catalyst disintegration correspondingly suppressed while activity, selectivity and catalyst life are maintained at highest levels, by supporting iron obtained by the decomposition of its carbonyl, i. e. $Fe(CO)_5$, on an essentially inactive non-metallic carrier of high attrition and disintegration resistance. The support for the carbonyl iron is preferably readily fluidizable, adsorptive and capable of promoting the selectivity of the final catalyst to liquid products. The carrier material itself may act as a promoter or it may contain small amounts of a conventional promoter such as $K_2CO_3$, $NaSiO_3$, KOH, KF, NaF, $KBF_4$, $Na_2CO_3$ or the like.

While a fairly wide variety of inactive supports is available for the purposes of this invention, superior results have been consistently obtained when using synthetic spinels such as $ZnO.Al_2O_3$, $Cr_2O_3.Al_2O_3$, $CuO.Al_2O_3$. Other suitable supports are stable carbonates, for example those of group II of the periodic system, particularly barium, calcium or zinc carbonate in which case an extraneous promoter is not usually required. Other supports which may be used include active carbons, for example the carbon formed in the synthesis reaction, ordinary soft glass having a composition such as $R_2O.CaO.6SiO_3$, in which R is an alkali metal; alumina-containing cracking catalysts such as silica-alumina composites which may contain about 87.5% $Al_2O_3$ and 12.5% $SiO_2$; silica-magnesia composites which may contain about 87.5% MgO and 12.5% $SiO_2$; etc. Mixtures of these supports may be used if desired.

The relative proportions of the constituents of the catalysts of the present invention may vary within wide limits. It has been found, however, that catalysts of excellent activity, selectivity, carbonization, mechanical strength and fluidization characteristics may be obtained by combining as little as 0.2% by weight of carbonyl iron in the supports of the invention, particularly the synthetic spinels listed above. The iron concentration may, therefore, be advantageously held within the most economical limits of preferably about 0.2%–10% without detrimentally affecting the catalytic performance of the catalyst. The amount of promoter added may vary between about 0.5 and 10% preferably about 1–5%, depending on the character of the promoter and of the support.

The catalysts of the invention may be prepared by saturating the selectivity-promoting support with the liquid iron carbonyl or a solution thereof and the decomposition may be accomplished by shock-heating, e. g. by blowing the impregnated support in a finely divided state into a chamber heated above the decomposition temperature of $Fe(CO)_5$ of about 300° F. Other suitable decomposition methods include exposure to supersonic waves, ultra-violet rays, or sunlight. However, in accordance with the preferred embodiment of the invention, the active iron is added to the support by passing iron carbonyl vapors through or over the support at a temperature of about 400°–1000° F., preferably about 600° F. The pressure may be in the range of from 1 to 30 atmospheres.

The latter method may be carried out to greatest advvantage in a fluid system of the type illustrated semi-diagrammatically in the drawing, as will be forthwith explained.

Referring now to the drawing, the system illustrated therein consists essentially of an elongated vertical fluid reactor 10, surrounded by a heating jacket 20. The upper portion of reactor 10 is expanded to form a separation zone 12 for the separation of suspended solids from gases.

In operation, reactor 10 may be supplied through line 1 with a finely divided selectivity-promoting support of the type specified above, having a fluidizable particle size of about 20–200 microns, preferably about 50–150 microns. A mixture of iron carbonyl vapors with a non-oxidizing gas such as methane, nitrogen or hydrogen is introduced through line 3 and grid 5 into the lower portion of reactor 10 at a superficial velocity adapted to maintain the finely divided catalyst support in the form of a dense, turbulent, fluidized mass having a well defined upper level $L_{10}$. Gas velocities of about 0.3–3 ft. per second are usually adequate at the particle sizes indicated to establish apparent densities of the fluidized solids mass of about 30–100 lbs. per cu. ft.

The mixture of $Fe(CO)_5$ vapors and non-oxidizing gas may be obtained by supplying its constituents in the proportion desired through lines 7 and 9, respectively, to line 3. However, the mixture may also be prepared by bubbling the non-oxidizing gas through a container of liquid iron carbonyl at room temperature and normal pressure.

Heating jacket 20 is supplied through tap 14 with a suitable heating fluid such as Dowtherm, superheated steam, etc. so as to heat the fluidized solids mass in reactor 10 above the decomposition temperature of iron carbonyl, preferably to a temperature of about 600°–700° F. Spent heating fluid is withdrawn through tap 16. As a result of the excellent heat transfer and the perfect gas-solids distribution within the fluidized solids mass, the carbonyl iron formed is uniformly deposited throughout the fluidized mass to form a substantially uniform film of iron on the catalyst particles. The thickness of the iron film may be readily controlled to correspond to the concentration ranges specified above by a proper choice of the iron carbonyl concentration of the gas entering through line 3 and/or the contact time between gas and solids and/or the throughput of the gas-vapor mixture. Conditions suitable to establish an iron concentration of about 1–5% by weight include the decomposition of from about 4 to 20 pounds of iron carbonyl vapors on each 100 pound batch of catalyst support. The carbonyl vapors may be diluted with from about ½ to about 100 volumes of methane, nitrogen, or the like before passing it into the fluidizable catalyst support which is held at a temperature of about 600° F. A gas velocity of about 0.3–3 ft. per second and pressures up to about 400 p. s. i. g. are employed. The preferred pressure range is about 5–50 p. s. i. g.

The non-oxidizing gas and any excess iron carbonyl vapors are withdrawn overhead from $L_{10}$ into separation zone 12 wherein most of the suspended solids settle out as a result of the decreased gas velocity. The gas is finally withdrawn through line 17 and may be recycled to the system, if desired, after further solids separation in conventional gas solids separators such as cyclones, precipitators, filters, etc. (not shown). Separated solids may be returned to reactor 10, passed to the synthesis reactor, or discarded.

The finished catalyst may either be withdrawn via overflow pipe 18 or via bottom drawoff line 22 to be directly supplied to a conventional fluid synthesis reactor. Instead of feeding the fresh support through line 1, it may be supplied through line 24 and suspended in the feed gases in line 3 in a manner known per se in the art of fluid catalyst operation. The system of the drawing may be operated continuously or batchwise as desired. A similar arrangement may be used for fixed bed activation of the catalyst support.

It will be understood that the system illustrated by the drawing may be used in a substantially analogous manner for the reactivation with iron of deactivated catalysts of the type here involved.

The invention will be further illustrated by the following specific example.

*Example*

A zinc aluminate spinel ($ZnO.Al_2O_3$) was prepared by adding a $ZnSO_4$-solution to a solution of sodium aluminate, followed by filtering of the precipitate, drying and calcining at 1200° F. The product was impregnated with a $K_2CO_3$-solution, dried in an atmosphere of $CO_2$ and pilled. A portion of the catalyst now containing about 5% of $K_2CO_3$ was placed in a reactor and heated to about 625° F. A stream of nitrogen was bubbled through a vessel containing liquid iron carbonyl at room temperature and normal pressure and the gas partly saturated with $Fe(CO)_5$ was passed into the reactor containing about 50 cc. of the $K_2CO_3$ promoted zinc aluminate until about 1% by weight of carbonyl iron was deposited on the catalyst.

The untreated portion of the catalyst and that treated with iron carbonyl were employed as synthesis catalysts in a laboratory test unit at a temperature of about 625° F., a pressure of about 250 lbs. per sq. in., and an $H_2$: CO feed ratio of 1:1. The result of these runs are summarized below:

| Catalyst | $ZnO.Al_2O_3+5\% K_2CO_3$ | |
| --- | --- | --- |
| | Untreated | Treated with $Fe(CO)_5$ |
| Average Iron Content of Catalyst, weight per cent | 0.0 | 1.0 |
| Hours on Stream | 0–138 | 153–160 |
| Synthesis Gas Feed Rate, v./v./hr | 400 | 260 |
| Co-Conversion, per cent | 5 | 98 |
| Yield of $C_4+$, cc./cu. m., $H_2+CO$ Cons. | Negligible | 207 |
| Average Carbon in Catalyst Bed, Excluding Wax, weight per cent | Negligible | 1.2 |

The above data show that active and selective synthesis catalysts may be made by decomposing iron carbonyl on the fluidizable substantially inactive bases of the invention, such as synthetic spinels. Carbon formation was only a fraction of that of conventional iron catalysts of comparable activity and selectivity, indicating a superior resistance to disintegration. The catalyst of the invention thus combines highest activity and liquid product selectivity with low carbon forming tendencies and high resistance to attrition and disintegration, which makes it ideally suitable for fluid operation. An additional advantage resides in the fact that this improved performance may be accomplished with an iron concentration on the catalyst as low as about 0.2% by weight which may be readily maintained constant by continuous or intermittent reactivations with decomposing iron carbonyl.

While the above data were obtained in fixed bed operation, it is noted that the catalysts of the invention compare just as favorably with conventional iron type catalysts in fluid operation, even though the higher gas throughputs, high recycle ratios and high catalyst turbulence typical for fluid operation quite generally cause a slight decrease of conversion and liquid product yields and an appreciable increase in carbon formation and catalyst disintegration. It follows that the catalysts of the present invention, as the result of the combination of characteristics demonstrated above, are particularly useful for fluid operation when prepared in fluidizable particle sizes substantially as outlined above. The conditions of fluid synthesis operation are well known in the art and need not be specified here in great detail for a proper understanding of the invention by those skilled in the art. Briefly, the conditions which are employed include temperatures of about 550°–750° F., pressures of about 200–650 lbs. per sq in., catalyst particle sizes of about 20–150 microns, superficial gas velocities of about 0.3–3 ft. per second, bed densities of about 30–100 lbs. per cu. ft., $H_2$: CO feed ratios of about 0.8–3:1, and recycle ratios of about 0.5–4.

Fluid operation of either or both the catalyst preparation and the hydrocarbon synthesis in the presence of the catalyst of the invention has the outstanding advantage over fixed bed operation that the iron concentration throughout the catalyst bed may be maintained substantially uniform as a result of the high turbulence of the fluidized bed. In fixed bed operation, on the other hand, the carbonyl iron is deposited preferentially on the first carrier layers contacted by the carbonyl during the preparation of the catalyst, which leads to serious disturbances in the operation of the process. This is illustrated by the fact that it was found that the first 10% of a carbonyl iron catalyst bed prepared in fixed bed operation contained about 8.4% of iron while the subsequent 90% of the bed contained only 0.19% of iron.

The present invention is not to be limited by any theory of the mechanism of the process or catalyst nor to any examples given merely for illustration purposes, but only by the following claims in which we wish to claim all novelty inherent in the invention.

We claim:

1. An improved process for producing valuable conversion products from CO and $H_2$ in the presence of iron base catalysts which comprises contacting CO and $H_2$ in synthesis proportions and at synthesis conditions including temperatures of about 550°–750° F., pressures of about 200–650 lbs. per sq. in., and $H_2$: CO feed ratios of about 0.8–3:1 adapted to the formation of normally liquid hydrocarbons with a catalyst consisting essentially of about 0.2–1% of carbonyl iron supported on subdivided zinc-alumina spinel containing about 0.5–10% of potassium carbonate.

2. The process of claim 1 in which said catalyst is maintained in the form of a dense turbulent bed of subdivided solids having a particle size of about 20–200 microns fluidized by gasiform reactants and reaction products at a superficial gas velocity of about 0.3–3 ft. per second to assume a bed density of about 30–100 lbs. per cu. ft.

3. The method of claim 1 in which said catalyst is prepared by passing a mixture of iron carbonyl vapors and non-oxidizing gas upwardly through a dense turbulent mass of fluidizable particles of said spinel containing said potassium carbonate, fluidized by said mixture to form a well defined upper level and heated to a temperature of about 400°–1000° F. conducive to the decomposition of said iron carbonyl.

HANS G. VESTERDAL.
HARRY J. SYKES.

REFERENCES CITED

The following references are of record in the file of this patent:

UNITED STATES PATENTS

| Number | Name | Date |
| --- | --- | --- |
| 1,148,570 | Bosch et al. | Aug. 3, 1915 |
| 2,234,568 | Linckh | Mar. 11, 1941 |
| 2,250,421 | Riblett | July 22, 1941 |
| 2,417,164 | Huber, Jr. | Mar. 11, 1947 |
| 2,447,016 | Kearby | Aug. 17, 1948 |

OTHER REFERENCES

Interrogation of Dr. Otto Roelen by Dr. Hall et al. (page 33), Hobart Pub. Co., Washington, D. C.